United States Patent

[11] 3,555,231

[72] Inventors Michel Laurentie
215 Blvd. Francois Ier;
Albert Bouteville, 29, rue Sery; Roger
Pennananec'h, 45 rue Louis Richard, Le
Havre, France
[21] Appl. No. 806,474
[22] Filed Mar. 12, 1969
[45] Patented Jan. 12, 1971
[32] Priority Mar. 13, 1968
[33] France
[31] No. 143,529

[54] PROCESS FOR WELDING BUTYL RUBBER
15 Claims, 3 Drawing Figs.
[52] U.S. Cl. ..................................... 219/10.53,
219/10.41; 156/273
[51] Int. Cl. ..................................... H05b 5/00,
B23k 13/02
[50] Field of Search ........................... 219/10.53,
10.41; 156/273, 10.55; 204/(Inquired);
140/(Inquired); 204/(Inquired)

[56] References Cited
UNITED STATES PATENTS

| | | | |
|---|---|---|---|
| 2,604,666 | 7/1952 | Bosomworth | 219/10.41X |
| 2,463,289 | 3/1949 | Leguillon | 219/10.53X |
| 2,472,820 | 6/1949 | Graham et al. | 219/10.53 |
| 2,691,613 | 10/1954 | Baer | 219/10.53 |
| 2,697,773 | 12/1954 | Gordon | 219/10.53X |
| 2,738,406 | 3/1956 | Zaleski | 219/10.55 |
| 2,811,624 | 10/1957 | Haagensen | 219/10.55 |
| 3,232,810 | 2/1966 | Reesen | 219/10.53X |
| 3,336,173 | 8/1967 | Renfroe | 156/273X |

OTHER REFERENCES
Copson, Microwave Heating, The Air Publishing Co. 1962 pages 23—25

*Primary Examiner*—J. V. Truhe
*Assistant Examiner*—L. H. Bender
*Attorney*—Waters, Roditi, Schwartz and Nissen

ABSTRACT: Two overlapped sheets of butyl rubber are welded together by applying UHF energy to the sheets, by means of a transducer connected to a UHF generator, and pressing the sheets together until the weld is formed.

PATENTED JAN 12 1971
3,555,231
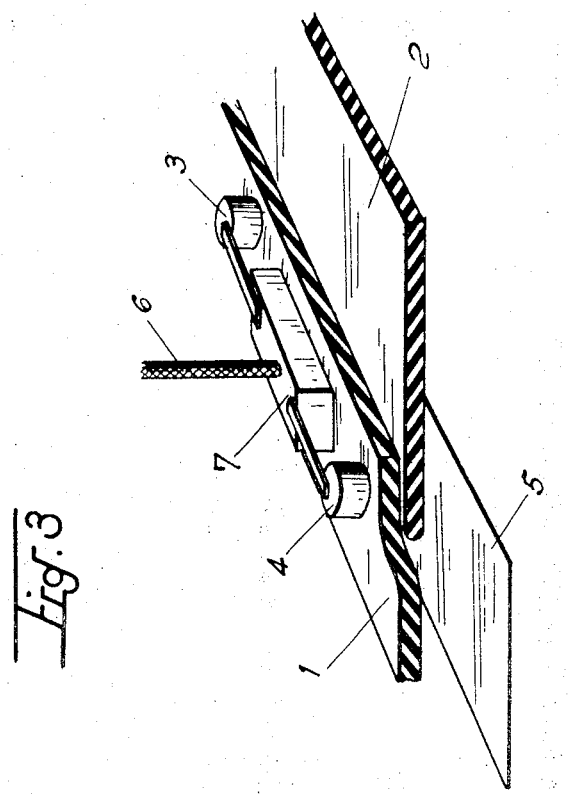
Fig.3
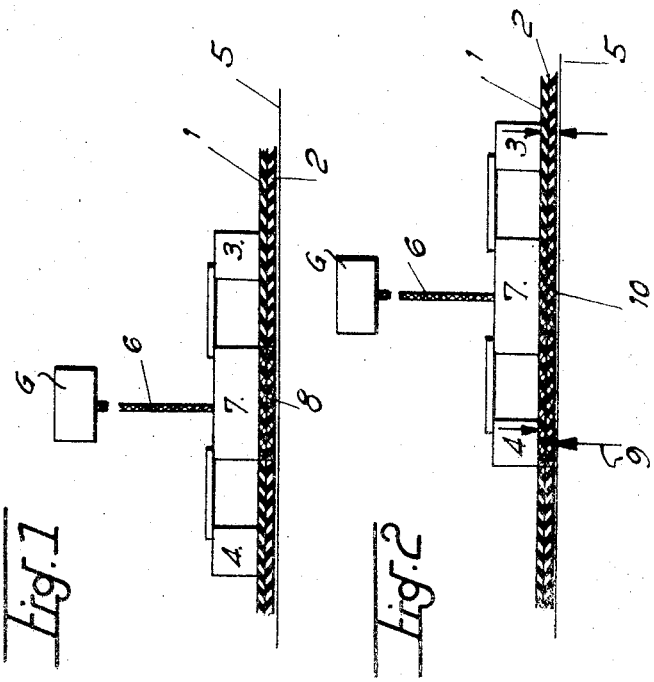
Fig.1
Fig.2

PROCESS FOR WELDING BUTYL RUBBER

BRIEF SUMMARY OF THE INVENTION

The present invention relates to a process for welding butyl rubber, and to apparatus for achieving such welding.

It is known that mixtures based on butyl rubber—(butyl for short)—can be molded or extruded in various shapes and also rolled into sheets of very reduced thickness, the width of which varies between 1 m. and 1.50 m. These sheets are usually produced as coils of 20 m. length. They are mainly utilized for covering surfaces to make them watertight, for example, terraces, pools, etc., and when employed for these purposes it is necessary to weld them together in order to assure hermetic seal of the joints.

Up to the present time, conventional means have been employed for welding the sheets of butyl rubber together.

There has been utilized, for example, an electrical heating resistance in order to raise the temperature of the contacting butyl surfaces so that the butyl softens and welds together. The main disadvantage of this welding method is caused by the temperature differential between the surfaces to be welded and the outer surfaces of the sheets, i.e. those surfaces to which the heating resistance is applied. In practice, the outer surfaces must be brought to such a high temperature that the temperature necessary for achieving the weld is obtained by heat conduction at the interface of the two sheets to be welded together.

Other assembling means currently utilized consist in bonding together the two sheets by means of adhesive tape, or an adhesive substance, or by the use of additives or solvents, for example, of a mixture known commercially under the name "-Dissolution." In this case an additive, foreign to the butyl, is employed with all the disadvantages due to the lack of homogeneity of the bonded assembly, which subsequently is to be subjected to mechanical and chemical stresses. Moreover, welding by means of a heating resistance or bonding by means of tape, "Dissolution," or similar products, are all very slow procedures, since one cannot, with the conventional means, exceed an assembling speed in excess of 1 m. per minute.

The present invention has the objective of providing new means for welding butyl rubber to produce a watertight seal in a joint between assembled sheets.

Another object of the invention is to provide a heating means for welding butyl which produces a homogeneous temperature rise within the entire mass of the rubber in the region of the joint.

Another object of the invention is to provide a means for the speedy assemblage of butyl sheets, without recourse to any substances foreign to the butyl rubber itself.

In accordance with the invention there is provided a method for welding butyl rubber, which comprises heating two sheets of the rubber in contact with each other by means of electromagnetic waves of ultrahigh frequency (UHF for short) and in holding the sheets pressed together until the weld is achieved.

The applicants have discovered, in a quite surprising manner, that butyl rubber welds satisfactorily and definitively by mere UHF heating, whereas other synthetic rubbers, such as neoprene and ethylene-propylene terpolymer do not weld when subjected to UHF, although they undergo a temperature rise exceeding that of butyl rubber for the same amount of energy expended.

This result is all the more surprising as, among a great variety of elastomers and resin substances, butyl rubber in its crude state is among those which heat the least easily by UHF energy.

The invention further contemplates apparatus for welding butyl rubber comprising in combination:
  a. means for generating electromagnetic UHF waves;
  b. means for directing the waves onto the surfaces to be welded; and
  c. means for pressing the butyl sheets to be welded together.

The means for generating the electromagnetic UHF waves can be any of those known at present, and in particular electromagnetic induction coils and magnetron oscillators. There is used in the realization of the invention, a generator emitting waves of a frequency exceeding 900 MHz. The amount of electrical power necessary for generating these waves will depend upon the characteristics of the equipment, the dimensions and nature of the surfaces to be welded, the thickness of the butyl rubber sheets, and finally upon the nature of the butyl rubber formulation used. Generally this power amounts to between 800 wts. and 1 kw.

The waves generated by the UHF oscillator are led to a transducer, for example by a coaxial cable, or a flexible waveguide, and it is through the intermediary of this transducer that the UHF energy radiates into the mass of the butyl rubber in order to bring it in a homogeneous manner to the desired welding temperature.

Among the mechanical means which can be utilized for exerting pressure to maintain overlapping edges of two butyl rubber sheets in intimate contact with each other, a particularly advantageous means consists of the combination of a metallic sheet strip with one or more electromagnets, the sheets to be welded being interposed between the electromagnets and the sheet strip so that the overlapped edges of the butyl rubber sheets are clamped together.

BRIEF DESCRIPTION OF THE DRAWING

FIGS. 1 and 2 are schematic sectional views of the welding apparatus in which FIG. 1 represents the unit at the start of a first welding cycle, and FIG. 2 the same unit at the beginning of the next following welding cycle; and FIG. 3 is a schematic view in perspective, of the welding apparatus.

DETAILED DESCRIPTION

The welding apparatus will next be described below in detail with reference to FIGS. 1 and 2.

Therein are shown two sheets of butyl rubber 1, 2 adapted to be welded together at their overlapping surfaces. At the beginning of a first welding cycle (FIG. 1), a transducer 7, connected by a coaxial cable 6 to a generator G of UHF electromagnetic waves of a frequency of, for example, 2000 MHz., radiates these waves into a zone 8 beneath the transducer, while electromagnets 3 and 4 cooperate with a metallic strip 5 to press the sheets 1 an 2 together, as indicated by the arrows 9.

When the zone 8 has been brought to a sufficient temperature, for example to 180° C., the radiation is stopped, whereas the electromagnets 3, 4 and strip 5 continue to exert pressure on the butyl rubber sheets to assure a secure weld.

After welding of zone 8 has been completed, the assembly of the transducer and electromagnets advances over a distance equal to the length of the transducer 7 and a new welding cycle is begun (FIG. 2) and this operation is repeated in succession until the two butyl rubber sheets 1 and 2 have been welded together along their entire length.

The preceding description relates to a semicontinuous welding process, but the unit can also be displaced continuously along the welding seam.

It can be seen from the above description that the greatest efficiency of the machine will be attained when the time for clamping the sheets 1 and 2 together coincides with the period of radiation by the transducer 7, so that no time is lost in waiting between the welding of the two neighboring zones 8 and 10.

Equal lengths of time for radiation and clamping pressure can be obtained by adjusting the amount of energy radiated by the transducer. Under such conditions, a device according to the invention can weld up to 10 m. per minute. Generally speaking, the welding speed of butyl rubber, according to the process of the invention, lies between 2 and 20 met. per minute.

The weld obtained according to the invention is perfectly effective and, unless a shearing force much greater than the stresses to which welded butyl sheets are usually subjected is applied, these sheets cannot be separated. The strength of the weld according to the invention is superior to that obtained by conventional means.

It goes without saying that any modification of the number of heating means or clamping means of the machine would still fall within the scope of this invention. Thus, for example, a machine having two transducers and twice the number of electromagnets could operate twice as fast as the one which has been illustrated and just described.

The welding apparatus can be additionally provided with means for guiding it along the ribbon of butyl to be welded. For example, there can be utilized for this purpose a propulsion system with locating marks, which controls movement of the apparatus relative to the butyl rubber and parallel to the sheet lying on the transducer side of the unit.

Generally, the thickness of the butyl rubber sheets is in the range of 5 mm.; but the process of the invention allows very satisfactory welding of much thicker sheets of butyl rubber up to the thicknesses of about 2 cm.

A good weld of the butyl rubber sheets is obtained in using an overlap of about 1.5 cm., but in a general manner this overlap will be between 1 and 3 cm. As a matter of comparison, it may be noted that when two sheets are joined by bonding methods, an overlap in the range of 5 to 6 cm. must be used.

The temperature to which the lap edges of the butyl rubber sheets are heated for welding, varies between 150° and 250° C. and preferably should lie between 180° and 220° C. The applicants have actually observed that if the rubber is heated to 180° C. by UHF energy, the welding speed can be four times greater than that at 160° C., although a further temperature rise may still be theoretically beneficial, there arises the risk of thermally degrading the butyl rubber and of causing differences of composition in the welded mixture, for example, due to the evaporation of stabilizers or other ingredients. These are the same disadvantages encountered when butyl rubber is heated by means of an electrical heating resistance; the outer portion in contact with the resistance is actually at a temperature much higher than that of the interface of the sheets to be welded.

The welding time is a function of the nature of the materials to be welded, i.e. of the particular quality of the butyl rubber in question and of the total thickness of the sheets. It is also a function of the time consumed in attaining the welding temperature within the mass of the butyl rubber, i.e. of the energy radiated by the transducer.

The time of heating necessary for welding cannot be determined in advance in each particular case; likewise, the time for which the two welded rubber sheets must be maintained clamped together must be determined by practical experimentation. Once these times have been established, they can be controlled in the course of the subsequent, actual welding.

It is seen from the above that the present invention is characterized by welding ordinary butyl rubber sheets without addition of additives or special pretreatment of any kind) merely by applying UHF energy in an operative amount to effect welding while pressing the sheets together until the weld is formed.

We claim:

1. A process for welding sheets of butyl rubber, said method comprising applying ultrahigh frequency energy substantially corresponding to at least 900 MHz. to two sheets of butyl rubber, which are in contact with each other, to raise the temperature of the sheets, and pressing the sheets together where they are in contact, to achieve a weld.

2. A process according to claim 1, wherein the temperature of the butyl rubber sheets lies between 150° and 250° C.

3. A process according to claim 2, wherein the temperature lies between 180° and 220° C.

4. A process according to claim 1, wherein the ultrahigh frequency energy is progressively applied along the length where the sheets are in contact with one another at a welding speed between 2 and 20 m. per minute.

5. A process according to claim 2, wherein the thickness of the sheets of butyl rubber to be welded is less than 2 cm.

6. A process according to claim 2, wherein the two sheets to be welded are overlapped by an amount between 1 and 3 cm.

7. Apparatus for welding sheets of butyl rubbers said apparatus comprising, in combination, energy generating means for generating UHF electromagnetic energy substantially corresponding to at least 900 MHz., energy directing means for directing said energy onto adjoining surfaces of sheets of butyl rubber to be welded, and means coupled with said energy directing means for pressing sheets to be welded together against each other.

8. Apparatus as claimed in claim 7, wherein said means for generating UHF electromagnetic energy comprises an inductance coil.

9. Apparatus as claimed in claim 7, wherein said means for generating UHF electromagnetic energy comprises a magnetron oscillator.

10. Apparatus as claimed in claim 7, wherein said means for directing the energy onto the sheets of rubber to be welded comprises a transducer for radiating energy into the rubber to be welded.

11. Apparatus as claimed in claim 10, wherein said means for directing the energy onto the sheets of rubber to be welded further comprises a flexible cable coupling said transducer with the means which generates the UHF energy.

12. Apparatus as claimed in claim 7, wherein said means for generating UHF electromagnetic energy has a power rating between 800 wts. and 1 kw.

13. Apparatus as claimed in claim 7, wherein said means for pressing the sheets together comprises a sheet metal strip on an outer surface of an outermost sheet and electromagnet means on an outer surface of the other outermost sheet, said electromagnet means and said sheet metal strip cooperating to exert clamping pressure on the sheets.

14. Apparatus as claimed in claim 13, wherein said means for directing the energy onto the sheets of rubber to be welded comprises a transducer, said electromagnet means and the transducer being coupled for common displacement along the sheets in the region where they are to be welded together.

15. A process as claimed in claim 1 wherein said step of pressing the sheets together comprises applying an electromagnetic force to said sheets by a source engaging one surface of one of said sheets to pull a member operatively associated with said source toward said source, said member engaging one surface of the other of said sheets.